United States Patent [19]
Slack et al.

[11] Patent Number: 5,864,473
[45] Date of Patent: Jan. 26, 1999

[54] DUAL STAGE AC TO DC SWITCHING POWER SUPPLY WITH HIGH VOLTAGE, LOW CURRENT INTERMEDIATE DC AND LOW VOLTAGE, HIGH CURRENT REGULATED DC OUTPUT

[75] Inventors: William F. Slack, Garland; Gerald M. Hogan, Mesquite, both of Tex.

[73] Assignee: Operating Technical Electronics, Inc., Grand Prairie, Tex.

[21] Appl. No.: 676,858

[22] Filed: Jul. 3, 1996

[51] Int. Cl.$^6$ .................................................. H02M 3/335
[52] U.S. Cl. .............................................. 363/21; 363/97
[58] Field of Search ................. 363/20, 21, 97

[56] References Cited

U.S. PATENT DOCUMENTS

| | | | |
|---|---|---|---|
| 4,706,176 | 11/1987 | Kettschau | 363/21 |
| 4,885,674 | 12/1989 | Varga et al. | 363/21 |
| 5,012,401 | 4/1991 | Barlage | 363/97 |
| 5,408,401 | 4/1995 | Miyazaki | 363/21 |
| 5,408,402 | 4/1995 | Nonnenmacher | 363/21 |
| 5,459,652 | 10/1995 | Faulk | 363/21 |

*Primary Examiner*—Jeffrey L. Sterrett
*Attorney, Agent, or Firm*—Jack A. Kanz

[57] ABSTRACT

AC power is converted to a low-voltage, high-current DC output by a power supply which contains two stages. The first stage is an AC to DC converter using a full wave bridge rectifier to convert the voltage from the AC source to an intermediate raw DC voltage. The second stage is a DC to DC forward converter using a transformer with its primary winding connected to the intermediate raw DC voltage through a switch which is cycled "on" and "off" at a predetermined frequency. During the switch "on" portions of the cycle a current flows in the primary winding powering the output and charging an inductor which is connected to the secondary winding. When the switch is turned "off", no current flows through the transformer and the load is powered by the energy stored in the inductor. A secondary coil is magnetically coupled to the inductor and has a induced voltage proportional to the output voltage. A controller is used to control the duty cycle of the switch based on the voltage in the secondary coil which determines the power supply output. The duty cycle of the switch is varied in response to variations in the load.

1 Claim, 2 Drawing Sheets

DUAL STAGE AC TO DC SWITCHING POWER SUPPLY WITH HIGH VOLTAGE, LOW CURRENT INTERMEDIATE DC AND LOW VOLTAGE, HIGH CURRENT REGULATED DC OUTPUT

This invention relates to power supply circuits which convert AC inputs to DC outputs. More particularly, it relates to AC to DC power converters which provide a DC output isolated from the AC input and which compensate for load changes.

BACKGROUND OF THE INVENTION

Power conversion deals with converting electrical power from one form to another. In one form of power conversion, an alternating current (AC) input voltage is converted to a direct current (DC) output voltage. Such conversions are necessary to power DC devices (such as solid state devices) from conventional AC power sources such as standard wall outlets and the like. Modern power supplies are preferably small in size, lightweight, low cost and exhibit high power conversion efficiencies. In many applications it is also desirable that the power supply electrically isolate the load from the source to prevent transmission of noise or surges in the source to the load as well as to isolate the end user from the AC line for safety considerations. Such isolation is critical when the load contains sensitive electronics. Along with electrical isolation, the power supply should monitor the output conditions and compensate for changes in the load which result in changes in the output voltage and current of the power supply. The monitoring of the load to compensate for changes in the output voltage must be done while still maintaining the electrical isolation described above, and without significantly affecting power supply efficiency or output.

SUMMARY OF THE INVENTION

The present invention provides a power supply which converts power from an AC source to a DC voltage for powering a DC load. The output voltage, however, is electrically isolated from the source voltage and is continuously monitored by a coil magnetically coupled to the output voltage so that variations in load conditions which result in changes in output voltage are quickly compensated for by the power supply.

The power supply is divided into two stages. The first stage is an AC to DC converter whose DC output is a raw high-voltage, low-current DC source. The second stage is a DC to DC converter which converts the raw high-voltage, low-current DC source into a low-voltage, high-current DC source across which a DC load is connected. A controller regulates the output voltage to ensure that it remains essentially constant despite variations in the DC load or AC input voltage. The controller regulates the output voltage by sampling the output voltage and varying the properties of the second stage DC to DC converter when the output voltage indicates a change in the DC load conditions.

In the preferred embodiment the first stage is formed by a full wave bridge rectifier. The AC power source is connected to the full wave bridge rectifier through a fuse, a thermistor to limit in-rush current, and an EMI filtering capacitor. The output of the full wave bridge rectifier is a raw high-voltage, high ripple DC. For an AC input between 108V AC and 132V AC the output of full wave bridge rectifier is a nominal 170V DC.

The DC to DC converter of the preferred embodiment includes a transformer with a primary and secondary winding. The primary winding of the transformer is connected across the raw DC voltage from the full wave bridge rectifier through a switching MOSFET transistor. The switching transistor is switched "on" and "off" at a nominal frequency of 200 kHz resulting in a 5 $\mu$s cycle time. During the portion of the cycle in which the switching transistor is "on", voltage is imposed across the primary winding of the transformer and which causes a voltage to be induced in the secondary winding. The voltage on the secondary winding is coupled through a diode (or forward rectifier) which becomes forward biased as well as a coil acting as an inductor and the DC load before returning to the secondary coil. This transformer output voltage forces inductor current to increase with time.

When the switch transistor is turned "off", current is stopped from flowing in the primary coil, resulting in no current in the secondary coil reverse biasing the forward rectifier. The inductor current then begins to decrease with time thus delivering its stored energy to the DC load and a diode (or freewheel rectifier) which is shunted across the secondary coil and forward rectifier. At some point during the discharge of the inductor energy the switch MOSFET transistor turns back "on", causing the inductor current to increase with time. A capacitor is shunted across the DC load to filter variations in the output current and provide a constant voltage to the DC load. A coil is magnetically coupled to the inductor to produce a voltage proportional to the output voltage. The load on the coil is kept very small such that substantially all the power produced by the power supply is delivered to the DC load.

Switching of the transistor is controlled by an integrated circuit controller using a method termed "peak-current-control". The controller regulates the voltage at the output terminals by monitoring the voltage at the coil and controlling the duty cycle of the switch transistor. The longer the duty cycle the more power provided to the output. Variations in the output are accounted for by lengthening or shortening the duty cycle. As stated the controller monitors the output voltage using the coil electrically coupled to the inductor in the output which has an induced voltage across the coil is proportional to the output voltage and, therefore, indicates when variations in load conditions occur. The amplified difference between this voltage and an internal reference voltage, referred to as the error amplifier output, is sent to a pulse width modulator which compares the output voltage of the error amplifier with a voltage proportional to the current flowing through the switch transistor using an internal comparator in the controller. The output of the pulse width modulator is used to determine the duty cycle of the switch transistor.

The controller is powered in steady state operation by the voltage developed across the secondary coil of the output inductor, thereby eliminating the need for an outside power source to power the controller.

BRIEF DESCRIPTION OF THE DRAWING

Other features of the invention will become more readily understood from the following detailed description taken in conjunction with the appended claims and accompanying drawing wherein:

DESCRIPTION OF THE PREFERRED EMBODIMENT

Figure 1:
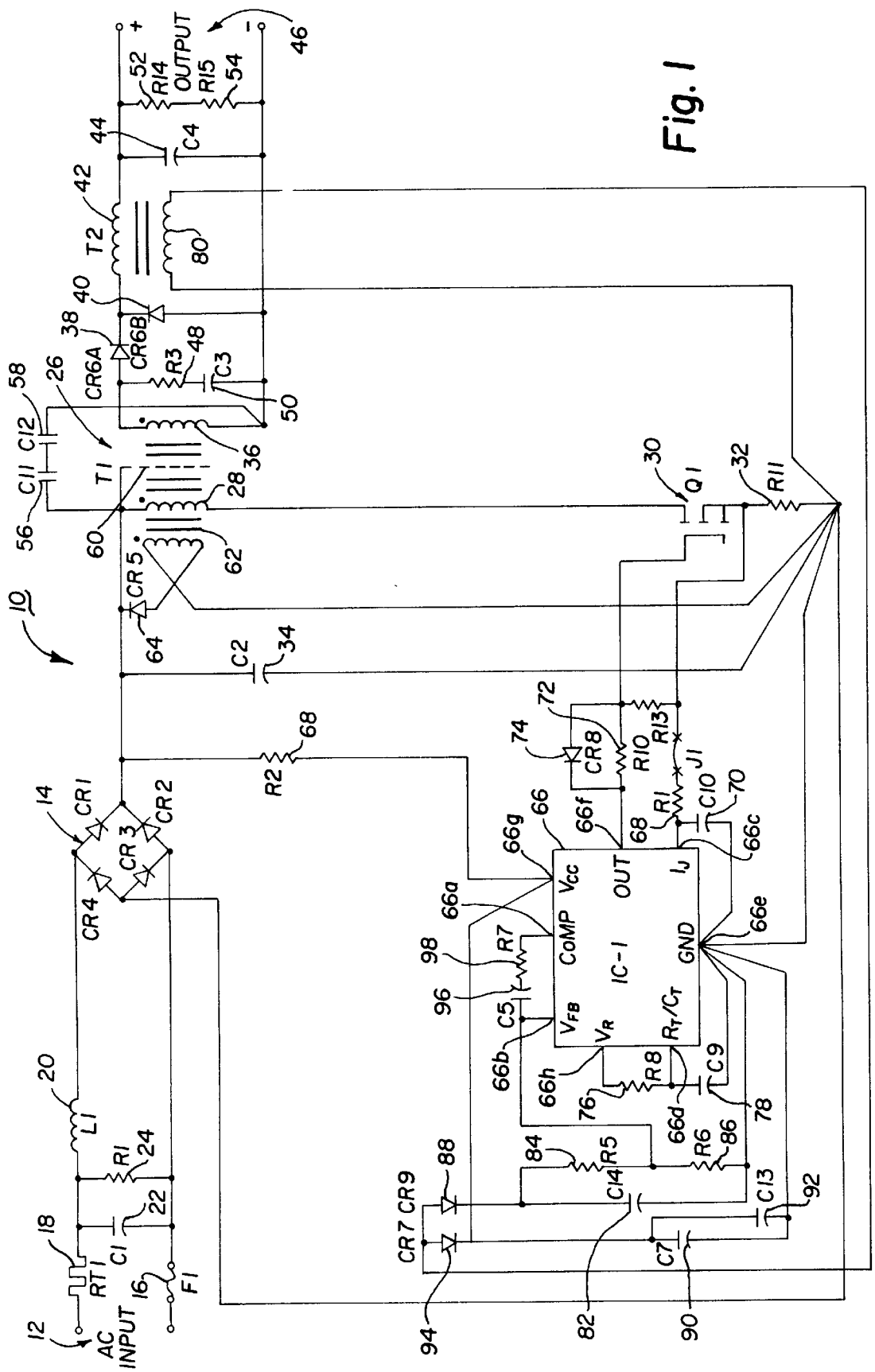
FIG. 1 is a circuit diagram of the preferred embodiment of an AC to DC power supply employing the invention.

A circuit diagram 10 of a preferred embodiment of the AC to AC power supply of the invention is illustrated in FIG. 1.

Circuit 10 is provided with an AC input 12 which is applied to an AC to DC converter formed by full wave bridge rectifier 14. Fuse 16 connected at AC input 12 prevents power supply circuit 10 from drawing excessive input current in the event of circuit failure. Negative temperature coefficient thermistor 18, also connected at AC input 12, limits in-rush current during the initial power up of power supply circuit 10. Inductor 20 and capacitor 22 form a low-pass filter which is used to attenuate noise generated by the converter switching action. Because capacitor 22 is connected across the input terminals of AC input 12, resistor 24 is placed in parallel with capacitor 22 to bleed off charge when the power source is disconnected from AC input 12. This insures that AC input 12 will not have the voltage across capacitor 22 at the input terminals when AC input 12 is disconnected which would be a serious shock hazard.

The raw DC output of full wave bridge rectifier 14 is applied to a DC to DC converter. The raw DC output is connected across primary winding 28 of transformer 26 in series with transistor 30 and resistor 32. When transistor 30 is "on" current flows through primary winding 28, transistor 30, resistor 32 and then back to primary winding 28 through capacitor 34. Resistor 32 is used to provide a voltage proportional to the current through primary winding 28.

Secondary winding 36 of transformer 26 is connected to DC output 46 of power supply circuit 10 through forward rectifier 38, freewheel rectifier 40, output capacitor 44 and primary coil 42 acting as an inductor. Output capacitor 44 and primary coil 42 act as a filter to prevent AC voltage components which appear at the node between primary coil 42 and forward rectifier 38 from being imposed across capacitor 44, thereby providing a smooth output. Resistor 48 and capacitor 50 are connected across secondary winding 28 and act to damp parasitic ringing which could damage forward rectifier 38 and freewheel rectifier 40. Resistors 52 and 54 are connected across DC output 46 to provide a minimal preload to prevent excessive output voltage rise at no load conditions.

Transformer 26 includes shield 60 between the windings to prevent the primary switching frequency and associated harmonic voltages from causing capacitive current flow between the primary winding 28 and secondary winding 36. Capacitors 56 and 58 are connected across primary winding 28 and secondary winding 36 and provide a low impedance, high-frequency path which is used to attenuate common mode EMI developed across transformer 26. Capacitors 56 and 58 are preferably Y-type capacitors connected in series to provide double insulation.

Transformer 26 also includes clamp winding 62. Clamp winding 62 is coupled to primary winding 28 and acts to return energy stored in transformer 26 back into capacitor 34. When transistor 30 is "off" a rectifier diode 64 is caused to conduct by the action of transformer 26 through clamp winding 62.

Controller 66 is used to control power supply circuit 10. As stated above, resistor 32 is used to develop a voltage proportional to the current through primary winding 28. This voltage is used as an input to pin 66c of controller 66 through resistor 68. Capacitor 70 is used to attenuate the voltage spike produced at the turn "on" of transistor 30 which could otherwise prematurely trip controller 66. Output 66f of controller 66 is connected to the gate of transistor 30 through resistor 72 and controls the switching of transistor 30. Diode 74 is connected in parallel with resistor 72 and allows the rapid discharge of transistor 30 gate capacitance in order to achieve rapid turn "off" of transistor 30. Resistor 75, connected between the gate and the source of transistor 30, is used to guarantee that transistor 30 stays "off" between the application of power at AC input 12 and the activation of controller 66.

Resistor 76 (connected between pin 66h and pin 66d of controller 66) and capacitor 78 (connected between pin 66d and ground pin 66e) are used as clock timing components. In the preferred embodiment, resistor 76 and capacitor 78 set the operational frequency of controller 66 to a nominal 200 kHz.

Secondary coil 80, inductively coupled to primary coil 42, provides an output feedback voltage to controller 66. Secondary coil 80 charges capacitor 82 during a portion of the time that transistor 30 is "off" while diode 88 prevents capacitor 82 from discharging back through secondary coil 80. While transistor 30 is off, current in primary coil 42 flows in a loop consisting of primary coil 42, the output load, and freewheel rectifier 40. Since the voltage across freewheel rectifier 40 is small compared to the output voltage, the voltage across primary coil 42 is substantially equal to the output voltage, resulting in the voltage induced in secondary coil 80 being substantially proportional to the output voltage.

Resistors 84 and 86 form a voltage divider to provide a voltage proportional to the voltage across capacitor 82 to voltage feedback pin 66b. The voltage at voltage feedback pin 66b is compared to an internal reference voltage in controller 66 and is used to stabilize the voltage at DC output 46. Capacitor 96 and resistor 98 are connected between feedback voltage pin 66b and pin 66a and serve as an error feedback amplifier components, the values of which are chosen to insure feedback loop stability.

Secondary coil 80 is also used to charge capacitor 90 through diode 94. The voltage across capacitor 90 provides the necessary power to controller 66 in steady state operation. Capacitor 92 acts as a high frequency bypass capacitor. At initial power "on", capacitor 90 is initially charged through resistor 68. When capacitor 90 reaches a sufficient voltage (about sixteen volts), controller 66 becomes active. Controller 66 draws current from capacitor 90 until DC output 46 reaches operating voltage and secondary coil 80 recharges capacitor 90.

Power supply circuit 10 accepts AC input from 108V AC to 132V AC and provides a single DC output at 12.8 volts at 5.25 amps. Power supply circuit 10 provides output voltage stabilization against load variations; output voltage stabilization against line regulation; input/output isolation to satisfy safety agency requirements; and voltage conversion to deliver a low-voltage, high-current DC from the high-voltage, low-current AC source.

Power supply circuit 10 operates in two stages. The first stage accepts the AC source input at AC input 12. Full wave bridge rectifier 14 converts the AC source into a raw DC voltage which is nominally 170V. This 170V raw DC serves as the input to the second stage DC to DC forward converter.

The DC to DC converter functions by the switching of transistor 30. Controller 66 switches transistor 30 at a frequency of 200 kHz as set by resistor 76 and capacitor 78. Transistor 30 is "on" and conducting for a period which is less than half the 5 $\mu$s period. For the remaining portion of the period transistor 30 is "off" and not conducting.

When transistor 30 is "on", primary winding 28 is connected across the raw DC voltage from the full wave bridge rectifier 14. By action of transformer 26, the secondary winding is biased so as to forward bias forward rectifier 38 and reverse bias freewheel rectifier 40. Current then flows through secondary winding 36, forward rectifier 38 and primary coil 42 to the load connected to DC output 46. The load on secondary coil 80 is scaled to conduct minimal current compared to primary coil 42 such that primary coil 42 acts as an inductor.

When transistor 30 is "off", no current flows through secondary winding 36 and forward rectifier 38 is reverse biased. Energy stored in primary coil 42 is released causing current to flow through the load connected across DC output 46 and back to primary coil 42 through freewheel rectifier 40. This action results in the current in primary coil 42 ramping up during the period when transistor 30 is "on" and ramping down during the period when transistor 30 is "off". Primary coil 42 and capacitor 44 attenuate AC voltage components resulting in the voltage across the load being essentially constant.

During transistor 30 "on" periods, magnetizing current and reflected secondary current appears in primary winding 28 of transformer 26. When transistor 30 is turned "off", magnetizing current appears in clamp winding 62 and flows through the rectifier diode 64 to capacitor 34. Thus substantially all energy stored in transformer 26 during transistor 30 "on" periods is returned to capacitor 34. Clamp winding 62 also serves as a voltage clamp to limit the maximum voltage stress on transistor 30.

Output voltage regulation at DC output 46 is achieved by controlling the "on" time (or duty cycle) of transistor 30. This duty cycle control is provided by controller 66 which contains an internal reference voltage, error amplifier, pulse width modulator comparator, and a current sense amplifier. Controller 66 uses a mode known as "peak-current-control" to control the converter.

Figure 2:
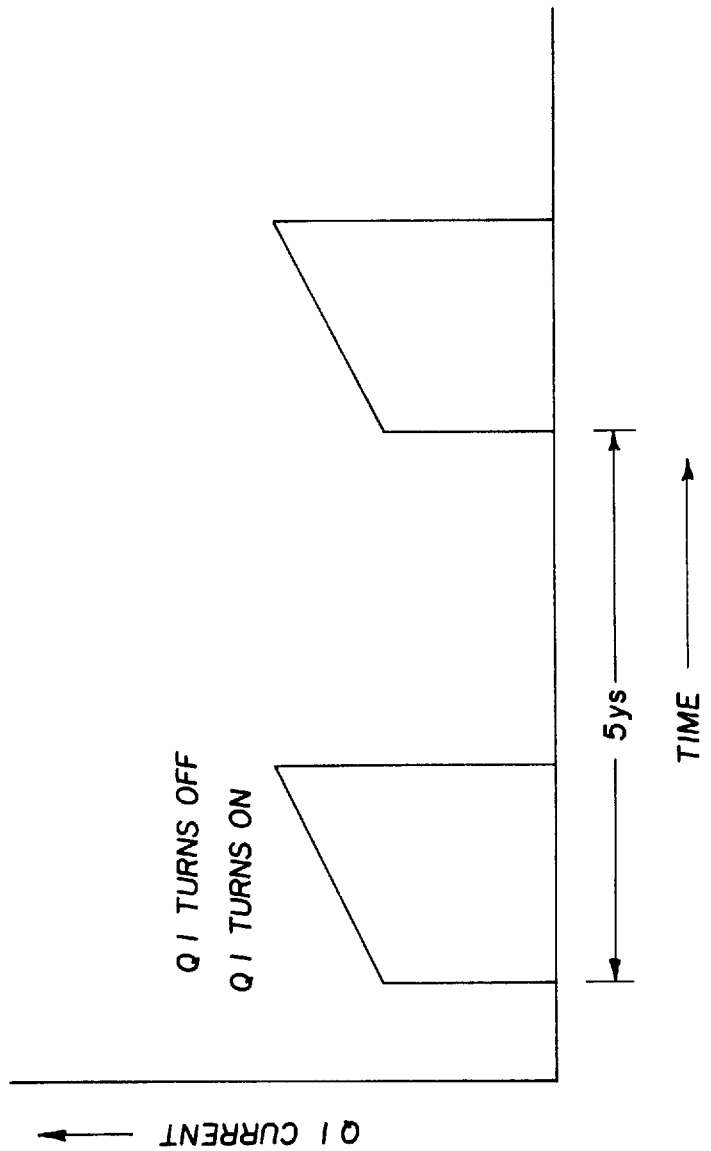
FIG. 2 is a graphic illustration of current through the primary coil of the transformer and the switch transistor from the circuit of FIG. 1 versus time.

Peak-current-control functions using the current through transistor 30. A representation of this current during a cycle of transistor 30 is shown in FIG. 2. When transistor 30 is turned "on", its current jumps to an initial value determined by the current through primary coil 42 as reflected through transformer 26. The current in transistor 30 ramps up from the initial value (as shown in FIG. 2) due to increasing primary coil 42 and transformer 26 currents. As stated, the current through transistor 30 is converted to a voltage by resistor 32 and the voltage developed is sensed by controller 66.

The voltage developed at resistor 32 (and seen by pin 66c of controller 66) serves as one input to the internal pulse width modulator comparator of controller 66. The other input to the internal pulse width modulator comparator is derived from the output of the error amplifier at pin 66a. When the voltage at pin 66c exceeds pin 66a voltage the "on" time of transistor 30 is terminated. The error amplifier output is the amplified difference between the internal reference of controller 66 and a voltage proportional to the voltage at DC output 46.

In operation, the output of the internal error amplifier would increase if the voltage at DC output 46 were to decrease because of an increase in load. By action of the internal pulse width modulator comparator, the peak current through transistor 30 needed to cause the termination of the transistor 30 "on" time would increase, causing the average current through switch transistor to increase and resulting in a higher power supply output current. This higher level of supplied output current results in a constant output voltage despite variations in load. Output voltage sensing is accomplished using secondary coil 80 as discussed above.

Output overload protection is provided by an internal clamp placed on the maximum internal error amplifier voltage. This maximum value forces switch transistor to turn "off" at a maximum switch transistor current despite greater demand from the load. This maximum current is set to represent an output current a bit greater than full load on the power supply.

All components shown in FIG. 1 except transformer 26 and controller 66 are standard electrical components and are readily available. Transformer 26, in the preferred embodiment, has the following characteristics: winding ratios of 37:37:9 for primary winding 28, clamp winding 62, and secondary winding 36, respectively; a primary winding inductance of 3.78 mH (+/− 20%); primary winding DC resistance of 230 mΩ; clamp winding DC resistance of 675 mΩ; and secondary winding DC resistance of 9.2 mΩ. Controller 66 is preferably part number UC 3842 available from Universal Scientific Industrial Co., Ltd. 141 lane 351, Tai Ping Rd. Sec. 1, Tsao Tuen Nan-Tou Hsien, Taiwan R.O.C.

While the invention has been shown and described with particular reference to a preferred embodiment, it will be understood by those skilled in the art that various changes in form and detail may be made therein without departing from the spirit and scope of the invention as defined by the appended claims.

What is claimed:

1. A power supply for converting AC power to low-voltage, high-current DC power comprising:

(a) an AC to DC converter which, when electrically connected to an AC power source, converts input AC power to high-voltage, low-current intermediate DC power, the AC to DC converter including an AC source input and a raw DC output;

(b) a storage capacitor connected in shunt across the raw DC output;

(c) a DC to DC converter electrically connected between the raw DC output of the AC to DC converter and a regulated DC voltage output, the DC to DC converter being operable to convert the high-voltage, low-current intermediate DC power to low-voltage, high-current DC power for powering a DC load, the DC to DC converter including a transformer having a primary winding, a secondary winding and a clamp winding, and including an output inductor electrically connected to a forward rectifier and a freewheel rectifier, the secondary winding being connected in series with the forward rectifier and in shunt with the freewheel rectifier;

(d) a rectifier diode electrically connected in series with the clamp winding, the series connected rectifier diode and clamp winding being connected in parallel with the storage capacitor;

(e) a secondary coil magnetically coupled to the output inductor;

(f) a switching transistor and a current sensing resistor connected in series with the primary winding; and, (g) a controller electrically connected to the switching transistor, the current sensing resistor and the secondary coil, the controller receiving a voltage proportional to the voltage across the output inductor from the secondary coil and receiving a voltage proportional to the current flow through the primary winding from the current sensing resistor to control the duty cycle of the switching transistor, thereby maintaining a substantially constant output voltage at the regulated DC output despite variations in the DC load or the AC power source, wherein high frequency ripple on the storage capacitor is minimized by transferring stored energy from the primary winding of the transformer via the clamp winding with current flow through the rectifier diode during the non-conducting portion of the switching transistor duty cycle.

* * * * *